United States Patent [19]

Khattab

[11] 4,376,188

[45] Mar. 8, 1983

[54] HIGH MELT STRENGTH COMPOSITION COMPRISING MODIFIED POLYCAPROLACTAM AND IMPACT MODIFIER

[75] Inventor: Ghazi M. A. Khattab, Succasunna, N.J.

[73] Assignee: Allied Corporation, Morris Township, Morris County, N.J.

[21] Appl. No.: 273,126

[22] Filed: Jun. 12, 1981

Related U.S. Application Data

[62] Division of Ser. No. 128,438, Mar. 10, 1980, Pat. No. 4,319,007.

[51] Int. Cl.$^3$ .................... C08L 23/16; C08L 77/02
[52] U.S. Cl. ................................. 525/183; 525/426; 525/431; 528/323; 524/606; 264/500
[58] Field of Search .................... 525/183, 426, 431; 264/500

[56] References Cited

U.S. PATENT DOCUMENTS 3,341,501  9/1967  Hedrick et al. .................. 528/320
3,673,155  6/1972  Holub et al. ...................... 528/28

Primary Examiner—Harold D. Anderson
Attorney, Agent, or Firm—Richard A. Negin

[57] ABSTRACT

Compositions are described, which are blow-moldable into shaped articles, comprising a reaction product between polycaprolactam, aminoalkyltrialkoxysilane and a catalytic amount of water. The compositions have a melt index of about 2.25 g/10 min. or below and are substantially free of trialkoxysilane groups. Preferred compositions also contain ethylene/vinyl acetate copolymer as an impact modifier to increase the impact strength of blow-molded articles made therefrom, such as bottles.

12 Claims, No Drawings

HIGH MELT STRENGTH COMPOSITION COMPRISING MODIFIED POLYCAPROLACTAM AND IMPACT MODIFIER

This is a division, of application Ser. No. 128,438, filed Mar. 10, 1980, now U.S. Pat. No. 4,319,007.

BACKGROUND OF THE INVENTION

1. Field of the Invention

This invention relates to high melt strength, high impact resistant polycaprolactam compositions, containing aminoalkyltrialkoxysilane compound, a process for producing same and products made therefrom.

2. Brief Description of the Prior Art

Although polyamide molding compositions and other polymers having low melt strength values have met with a high degree of commercial success, they are generally not used for applications where a particular melt strength is required, such as in blow-molding processes to produce bottles or other relatively heavy duty containers.

U.S. Pat. No. 3,673,155 (June 27, 1972) describes bis(aminoorganosilyl)hydrocarbon-modified polyamides useful as molding compounds and insulating film. However, the reference does not describe compositions, useful in blow molding applications, which have high melt strength.

U.S. Pat. No. 3,341,501 (Sept. 12, 1967) describes linear polyamide compositions having organosilane end groups, which can be bonded to glass or metal with a tenacity that withstands boiling water. However, the reference does not describe polyamide compositions having high melt strength which are useful in blow-molding applications.

There is a need in the art to modify polyamide compositions, particularly polycaprolactam having a low melt strength value, in such a way as to improve both its melt strength as well as its stability at elevated temperatures. Potential markets for blow-molded polycaprolactam have not been effectively developed owing to the fact that the melt strength of conventional polycaprolactam compositions is not high enough for practical blow-molding operations. In view of its low melt strength, conventional polycaprolactam compositions, even with close temperature control, form parisons lacking in integrity which have a tendency to neck-in. These parisons do not widen, whereas parisons prepared from materials having high melt strength, such as polyolefins, swell and drop easily over the blow pin in a blow-mold operation.

Therefore, polycaprolactam compositions having high molecular weight, high tensile strength, and capable of being blow-molded into relatively large heavy duty containers, are not presently commercially available.

SUMMARY OF THE INVENTION

In accordance with this invention, there is provided a polycaprolactam composition capable of being blow-molded into a shaped article.

Generally, the composition possesses a sufficient melt strength for the blow-molding of shaped articles and comprises the reaction product between polycaprolactam, aminoalkyltrialkoxysilane and a catalytic amount of water, said reaction product being substantially free of trialkoxysilane groups and said composition possessing a melt index of below about 2.25 g/10 min. Melt indexed is generally used as an indication of melt strength because melt strength is normally inversely proportional to the melt index. Thus, as the melt index increases the melt strength can be expected to decrease in proportion thereto.

A preferred embodiment is where the composition contains a reaction product of polycaprolactam, ethylene/vinyl acetate copolymer, gamma-aminopropyltriethoxysilane and a catalytic amount of water and the composition possesses a melt index of about 1 to 2 gram/10 min.

A process for producing the subject composition is also provided and comprises reacting polycaprolactam with an aminoalkyltrialkoxysilane, in the presence of a catalytic amount of water, at a temperature of about 225° to 350° C.

Further provided is a shaped article of manufacture produced by blow-molding the subject composition.

DETAILED DESCRIPTION OF THE INVENTION

The polycaprolactam to which the present invention applies includes that having a weight average molecular weight of at least about 10,000 and containing various amino and carboxyl types of terminal functionality. Preferred are the polycaprolactams (nylon 6) containing: (a) carboxyl groups attached to each end of the polymer chain; (b) a carboxyl group attached to one end and an acetamido group attached to the other end of the polymer chain; (c) an amino group attached to each end of the polymer chain; and (d) a carboxyl group attached to one end and an amino group attached to the other end of the polymer chain. More preferred is a polycaprolactam having a carboxyl group attached to one end and an amino group attached to the other end of the chain.

The polycaprolactam can be produced by any conventional process known in the art. Illustrative of one such process involves two steps: the first step consists of heating epsilon-caprolactam and hexamethylenediamine and water to a temperature of about 180° to 300° C. under superatmospheric pressure (about 200 to 280 lbs/in$^2$) to effect partial polymerization; the water is allowed to distill gradually from the reaction mixture while the polymerization continues after most of the monomer has been converted to a low molecular weight polymer; the pressure is reduced to atmospheric pressure wherein the second step is commenced which comprises completing the polymerization by heating at atmospheric pressure at a temperature of about 180° to 300° C.

Polycaprolactam useful in the present invention has a melt index (ASTM D-1238) of about 3 to 12 or greater, and preferably of about 3 to 6 grams/10 minutes.

It is important that the polycaprolactam whose melt strength is to be modified contain a catalytic amount of water to initiate the reaction of one aminoalkyltrialkoxysilane compound with another. Generally, the amount of water needed is about 0.05 to 5 weight percent based on the total weight of the polymer. By the term "catalytic amount" is meant the minimum amount needed, based on stoichiometry, to initiate the hydrolysis reaction of the aminoalkyltrialkoxysilane molecules thereby leading to a condensation and thus releasing additional water to maintain the overall reaction process.

Included among aminoalkyltrialkoxysilane compounds, or "aminosilane" compounds as used herein, suitable for use in the present invention are those compounds represented by the formula:

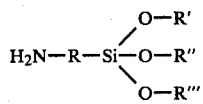

wherein R', R" and R'" are independently monovalent $C_1$ to $C_{18}$ linear or branched alkyl or aryl or alkyl-aryl; or R is a divalent $C_1$ to $C_{18}$ linear or branched alkylene alkylenaminoalkylene. The above-described groups can also be substituted with one or more substituents inert under the process conditions for forming or using the subject compositions including $C_1$ to $C_4$ alkoxy or halogen, such as chloro, fluoro and trifluoromethyl groups.

Representative examples of such aminosilane compounds include gamma-aminopropyltriethoxysilane, gamma-aminopropyltrimethoxysilane, beta-aminoethyltriethoxysilane, delta-aminobutyltriethoxysilane, gamma-aminopropyltripentoxysilane and N-beta-(aminoethyl)-gamma-aminopropyltrimethoxysilane. Preferred are gamma-aminopropyltrimethoxysilane and gamma-aminopropyltriethoxysilane.

The amount of aminosilane compound that is used is about 0.1 to 1.0 weight percent of the composition, and preferably about 0.2 to 0.5 weight percent. Larger amounts lead to great difficulty in processing the composition, and smaller amounts lead to insufficient melt strengths for blow-molding applications.

The subject composition is a reaction product between polycaprolactam and an aminosilane compound. It is believed that the amino group in the aminosilane reacts with free carboxyl group in polycaprolactam providing trialkoxysilane end-capped polymer and with the amide group in the polycaprolactam chain thus decreasing the chain length size. In the presence of the catalytic amount of water, the trialkoxysilane groups are hydrolyzed to produce —Si(OH)$_3$, which then reacts with another —Si(OH)$_3$ group to produce —Si—O—Si—O— linkages and thus bind together the two strands of polycaprolactam. It is believed that the increase in melt strength is due to branching of the polycaprolactam polymer chains which occurs during the above-described hydrolysis and condensation of trialkoxysilane groups. Due to the water initially present, and that produced during the condensation reaction, it is believed that substantially all of the trialkoxy groups initially present are reacted in the final subject composition.

The required melt strength of the subject composition, for operability in blow-molding processes, is achieved by the composition possessing a melt index of below about 2.25 g/10 min (ASTM D-1238). Preferred is a melt index of about 1 to 2 g/10 min.

The addition of the aforementioned aminosilane compounds to normally low melt strength polycaprolactam surprisingly increases the melt strength of the composition and renders it capable of being blow-molded into relatively heavy-duty containers and extruded into heavy-duty rods and tubes.

The impact resistance, although in some cases adequate, may be increased to a value equivalent to a drop weight value (ASTM D-2444) of at least 97 ft-lbs., by the use of an impact modifier such as ethylene/vinyl acetate copolymer.

The impact resistance can be substantially increased by the addition of about 1 to 50 wt. %, preferably about 3 to 30 wt. %, and more preferably about 5 to 20 wt. %, based on the total weight of the composition, of a copolymer having functional groups attached thereto which are compatible with the polycaprolactam substrate. Representative examples of such groups include esters, ethers, acids, anhydrides, epoxides, halides, isocyanates, isothiocyanates and carboxyl groups. Preferably, the copolymer is comprised of a diene or an olefin with one or more comonomers containing any of the aforementioned functional groups. More preferred are copolymers of ethylene or butadiene wherein the comonomer can be a vinyl ester such as vinyl acetate, vinyl salicylate, vinyl stearate and vinyl propionate and the like; acrylate esters such as methyl acrylate, ethyl acrylate, benzyl acrylate, octyl acrylate, methyl methacrylate, and the like; vinyl ethers such as vinyl 2-chloroethyl ether and methoxy polyethylene oxymethacrylate, and the like; and carboxylic acids such as acrylic, methacrylic, itaconic, fumaric, maleic, citraconic, α-methylene glutaric, aconitic, methylene-malonic, mesaconic acids and substituted acrylic acids such as β-hydroxymethyl- or α-halomethyl acrylic acids as well as acids such as methacryloxypropionic acid, acryloxy- or methacryloxyisopropyl acid phthalate, acryloxy- or methacryloxyethyl or isopropyl acid oxalate, maleate, succinate, glutarate and the like. Most preferably, the copolymer is a copolymer of ethylene and vinyl ester such as a copolymer of ethylene and vinyl acetate.

Ethylene/vinyl acetate copolymer suitable for use herein is that commercially available in a variety of formulations. That suitable for use in the present invention has a vinyl acetate content ranging from about 5 to 42 wt. % based on the total weight of monomers. Preferred is a formulation having a vinyl acetate content of about 25 to 35 wt. %, a melt index of about 3 to 6, an inherent viscosity of about 0.93, and a density of about 0.953.

A presently preferred composition is that possessing sufficient melt strength for the blow-molding of shaped articles comprising the reaction product between polycaprolactam, ethylene/vinyl acetate copolymer, gamma-aminopropyltrialkoxysilane and a catalytic amount of water, said reaction product being substantially free of trialkoxysilane groups, said composition possessing a melt index of below about 2.25 g/10 min. and said ethylene/vinyl acetate copolymer being present in about 5–20 weight percent of the composition and said aminosilane compound being present in about 0.01 to 1.0 weight percent of said composition.

Generally, a process for preparing the subject polycaprolactam compositions comprises feeding, into an extruder, a polycaprolactam resin containing a small amount of water, about 0.01 to 1.0 wt. % of an aminosilane compound, and optionally an impact modifier. The extruder can be any conventional extruder used for the extrusion of plastic materials and generally contains an electrically heated barrel, a metering-type screw and a screen and breaker plate. The temperature of extrusion is about 225° C. to 350° C., preferably about 300° C. When relatively volatile aminosilane compounds are used it is preferred that the extruder contain more than one heated zone, preferably four heated zones. The first zone is maintained at a temperature low enough so that the aminosilane compound does not volatilize, but at a temperature high enough so that the polyamide resin begins to melt and the ingredients commence to react. This temperature is preferably about 225° to 245° C., more preferably about 230° to 240° C. Zone two is maintained at a temperature of about 250° to 290° C., preferably 250° to 260° C. Zones three and four are maintained at a temperature of about 290° to 315° C., preferably about 290° to 300° C. Although the number of heating zones of the extruder is not critical, it is preferred, when a volatile aminosilane compound is used, that the temperature range of the extruder be about 225° to 245° C. at the point where the ingredients are introduced and about 290° to 315° C. at the point further down the extruder and up to the screen and breaker section of the extruder. It is understood that when a high molecular weight nonvolatile silane compound is used, the temperature throughout the extruder can be from about 290° to 315° C.

By "volatile aminosilane compound" we mean those aminosilane compounds, as previously stated herein, which are volatile at a temperature greater than about 230° C.

It is not critical to the present invention that the ingredients be fed into the extruder as a blend of distinct compounds. For example, the feed of ingredients can be comprised of a polycaprolactam resin, an aminosilane compound and optionally an impact modifier. The feed can also be comprised of a copolymer of polycaprolactam and impact modifier copolymer and an aminosilane compound; or, it can be comprised of a premixed blend of a polycaprolactam resin with an aminosilane compound which is further mixed with the impact modifier before feeding into the extruder. It is understood that mixtures of the various polymers suitable for use herein can be fed into the extruder with mixtures of the various aminosilane compounds suitable for use herein as well as the optional impact modifier ingredient.

The subject compositions, after extrusion and forming, generally have the following physical properties in the stated ranges: a tensile elongation-to-break of about 120 to 300% (ASTM D-638); a tensile strength of about 10,000 to 15,000 psi (ASTM D-638); a flexural strength of 13,000 to 15,000 psi (ASTM D-790); a flexural modulus of 350,000 to 375,000 psi (ASTM D-790); a notched Izod impact of 2.0 to 2.5 ft. lbs. per inch of notch (ASTM D-256); a drop weight impact of 90 to 140 ft. lbs. (ASTM D-2444); and a melt index of about 0.1 to 2.25 g/10 min as measured by ASTM D-1238.

Also provided is a shaped article of manufacture, for example a 4 oz. bottle for non-food application, produced by blow-molding the subject composition described herein.

The following examples are illustrative of the best mode contemplated by me of carrying out the invention and should not be considered as being limits on the scope or spirit of the instant invention.

EXAMPLE 1

11 Kg of a polyepsiloncaprolactam, having a Melt Index (M.I.) of 4.98 g/10 min. and a water content of about 0.1%, and 55 g of gamma-aminopropyltriethoxy silane, were introduced into an unvented twin screw extruder having a four temperature profile of about 240°, 260°, 250° and 245° C. The extruded material had an M.I. of 1.9 g/10 min. This example shows the increase in melt viscosity of polyepsiloncaprolactam when reacted with an aminosilane.

EXAMPLES 2–7

9.25 Kg of polyepsiloncaprolactam having an M.I. of about 4.90 g/10 min., and a water content of 0.1%, 750 g of ethylene/vinyl acetate copolymer and various amounts of gamma-aminopropyltriethoxysilane were introduced into an unvented twin screw extruder having a temperature profile of about 230°, 300°, 300°, 300° and 260° C. at the die. The melt index of the extruded materials were measured and the results are set forth in Table I below.

TABLE I

|  | Nylon Kg | EVA Kg | Silane Compound g | M.I. g/10 mi |
|---|---|---|---|---|
| Example |  |  |  |  |
| 2 | 9.25 | 0.75 | 35.0 | 2.23 |
| 3 | 9.25 | 0.75 | 37.5 | 1.99 |
| 4 | 9.25 | 0.75 | 40.0 | 1.82 |
| 5 | 9.25 | 0.75 | 42.4 | 1.14 |
| 6 | 9.25 | 0.75 | 45.0 | 1.03 |
| 7 | 9.25 | 0.75 | 47.5 | 0.7 |
| (Comparative) |  |  |  |  |
| (Comparative) A | 9.0 | 1.0 | 0 | 5.5 |
| (Comparative) B | 9.25 | 0.75 | 22.5 | 2.85 |
| (Comparative) C | 9.25 | 0.75 | 25.0 | 2.62 |
| (Comparative) D | 9.25 | 0.75 | 27.5 | 2.60 |
| (Comparative) E | 9.25 | 0.75 | 30.0 | 2.44 |
| (Comparative) F | 9.25 | 0.75 | 32.5 | 2.31 |

The above table shows the melt strength of polyepsiloncaprolactam when reacted during extrusion with increasing amounts of gamma-aminopropyltriethoxysilane in the presence of ethylene/vinyl acetate copolymer as an impact modifier. Examples 2–7 possessed sufficient melt strength to be blow-molded into bottles of 4 oz. capacity. The Comparative Examples A–F did not possess sufficient melt strength to be blow-molded into 4 oz. bottles.

EXAMPLE 8

Bottles were melt blown with two different polyepsiloncaprolactam materials. One material (Comparative Example G) was prepared by feeding, into an unvented twin screw extruder, 9.95 Kg of polyepsiloncaprolactam having a melt index of about 3.7 g/10 min. and 50 g of aminopropyltriethoxysilane. The melt index of the resulting composition was 0.2. The other material (Example 8) was prepared by feeding, into an unvented twin screw extruder, 8.95 Kg of a polyepsiloncaprolactam having a melt index of about 3.7 g/10 min., 1 Kg of EVA and 50 g of gamma-aminopropyltriethoxysilane. The melt index of the resulting composition was 0.6. Both polycaprolactams contained about 0.1% water. The physical properties of the bottles are shown in Table II below:

TABLE II

|  | Comp. Example G | Example 8 |
|---|---|---|
| Wall thickness, mil | 100 | 92 |
| Weight of bottle, g | 72 | 52 |
| Drop. Wt. Impact ft.lb/100 Mil (ASTM D-2444) | shatter | 97 |

The physical properties of the material of Example 8 are as follows: tensile strength, 10,840 psi (ASTM D-638); tensile elongation-to-break, 130% (ASTM D-638); flexural strength, 13,900 psi (ASTM D-790); flexural modulus, 369,000 psi (ASTM D-256); drop weight impact, 97 ft. lbs. (ASTM D-2444).

These examples illustrate that an aminosilane compound, such as gamma-aminopropyltriethoxysilane, when incorporated into polyepsiloncaprolactam, is surprisingly able to modify the polymer sufficiently to achieve the melt strength required for melt blowing. Where there is a need for higher impact strengths, an impact modifier such as ethylene/vinyl acetate copolymer can be used to increase the impact strength of the bottle for heavy duty practical use.

COMPARATIVE EXAMPLE H

10 Kg of polyepsiloncaprolactam having an M.I. of about 4.9 g/10 min. and a water content of about 0.1% was melt blended in an unvented twin screw extruder having a temperature profile of about 500°, 500°, 550° and 600° F., with 55 g of octyltriethoxysilane. The resulting material was found to have an M.I. of 6.5 g/10 min. This example demonstrates that not all organosilane compounds are suitable for use in improving the melt strength of polycaprolactam.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

What is claimed is:

1. A composition possessing sufficient melt strength for the blow-molding of shaped articles comprising the reaction product between polycaprolactam, having a melt index of at least 3 grams/10 minutes, aminoalkyltrialkoxysilane, and a catalytic amount of water, said reaction product being substantially free of trialkoxysilane groups, and said composition further comprising 1 to 50 percent by weight of the composition of an impact modifier, said composition possessing a melt index below about 2.25 g/10 min.

2. The composition of claim 1 wherein said impact modifier is ethylene/vinyl acetate copolymer.

3. The composition of claim 1 wherein said aminoalkyltrialkoxysilane is of the formula:

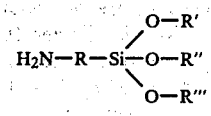

wherein R', R" and R''' are independently monovalent $C_1$ to $C_{18}$ linear or branched alkyl; R is a divalent $C_1$ to $C_{18}$ linear or branched alkylene or alkylenaminoalkylene.

4. The composition of claim 3 wherein said aminoalkyltrialkoxysilane is selected from the group consisting of gamma-aminopropyltrimethoxysilane and gamma-aminopropyltriethoxysilane.

5. The composition of claim 1 wherein said aminoalkyltrialkoxysilane is present in about 0.01 to 1.0 weight percent of the composition.

6. The composition as recited in claim 1 wherein the polycaprolactam has a melt index of from 3 to 12 grams/10 minutes.

7. The composition as recited in claim 1 wherein the amount of the impact modifier is about 3 to 30 percent by weight of the composition.

8. The composition as recited in claim 1 wherein the amount of the impact modifier is about 5 to 20 percent by weight of the composition.

9. A process for producing the composition of claim 1 comprising reacting polycaprolactam with an aminoalkyltrialkoxysilane in the presence of a catalytic amount of water, and the impact modifier at a temperature of about 225° to 350° C.

10. The process of claim 9 wherein said catalytic amount of water is about 0.05 to 0.3 wt. % water, based on the weight of the polycaprolactam.

11. A shaped article of manufacture produced by blow-molding the composition of claim 1.

12. A composition possessing sufficient melt strength for the blow-molding of shaped articles comprising the reaction product between polycaprolactam, having a melt index of at least 3 grams/10 minutes, ethylene/vinyl acetate copolymer, gamma-aminopropyltrialkoxysilane and a catalytic amount of water, said reaction product being substantially free of trialkoxysilane groups, said composition possessing a melt index of below about 2.25 g/10 min. and said ethylene/vinyl acetate copolymer being present in about 5-20 weight percent of the composition and said aminosilane compound being present in about 0.01 to 1.0 weight percent of said composition.

* * * * *